US012044993B2

(12) United States Patent
Murakami

(10) Patent No.: US 12,044,993 B2
(45) Date of Patent: Jul. 23, 2024

(54) IMAGE FORMING APPARATUS

(71) Applicant: TOSHIBA TEC KABUSHIKI KAISHA, Tokyo (JP)

(72) Inventor: Kiyotaka Murakami, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/948,420

(22) Filed: Sep. 20, 2022

(65) Prior Publication Data

US 2023/0021033 A1 Jan. 19, 2023

Related U.S. Application Data

(63) Continuation of application No. 17/338,490, filed on Jun. 3, 2021.

(30) Foreign Application Priority Data

Nov. 24, 2020 (JP) ................................ 2020-194137

(51) Int. Cl.
*G03G 15/20* (2006.01)

(52) U.S. Cl.
CPC ................................ *G03G 15/2053* (2013.01)

(58) Field of Classification Search
CPC .......... G03G 15/2017; G03G 15/2039; G03G 15/2042; G03G 15/2053; G03G 2215/2003
See application file for complete search history.

(56) References Cited

U.S. PATENT DOCUMENTS

2011/0123238 A1 5/2011 Kimura
2014/0138372 A1 5/2014 Ogura
2015/0139706 A1 5/2015 Fujiwara et al.
2015/0338803 A1 11/2015 Hirose et al.
2016/0132006 A1* 5/2016 Narahara .......... G03G 15/2053 399/329

FOREIGN PATENT DOCUMENTS

JP H0582243 A 4/1993
JP 2003317898 A 11/2003

* cited by examiner

*Primary Examiner* — Thomas S Giampaolo, II
(74) *Attorney, Agent, or Firm* — Kim & Stewart LLP

(57) ABSTRACT

In an embodiment, an image forming apparatus includes an image forming unit to form a toner image on a sheet and a fixing device to heat the toner image. The fixing device includes a cylindrical belt, a heater within the interior region to heat a region of the belt. A first and a second heat conduction member are also within the interior region. The heater is between the first heat conduction member and the belt, and also between the second heat conduction member and the belt. The second heat conduction member has a recess facing the heater.

20 Claims, 6 Drawing Sheets

IMAGE FORMING APPARATUS

CROSS-REFERENCE TO RELATED APPLICATIONS

This application is a continuation of U.S. patent application Ser. No. 17/338,490, filed on Jun. 3, 2021, which is based upon and claims the benefit of priority from Japanese Patent Application No. 2020-194137, filed Nov. 24, 2020, the entire contents of each of which are incorporated herein by reference.

FIELD

Embodiments described herein relate generally to an image forming apparatus such as a printer, copier, or the like.

BACKGROUND

An image forming apparatus that forms an image on a sheet is known. Such an image forming apparatus may form an image by fixing toner to a sheet of paper or the like. In this context, the toner is a kind of recording material. In general, there is a preference for the start-up time, or warming-up period, of an image forming apparatus necessary before the start of a printing operation to be as short of a time as possible.

DETAILED DESCRIPTION

In general, according to one embodiment, an image forming apparatus includes an image forming unit, configured to form a toner image on a sheet, and a fixing device, configured to heat the toner image on the sheet. The fixing device includes a cylindrical belt surrounding an interior region and having an outer surface configured to contact the sheet. A heater having a width in a first direction and a length in a second direction is within the interior region and positioned to heat a region of the outer surface of the belt. A first heat conduction member is within the interior region. The heater is between the first heat conduction member and the region of the outer surface in a third direction orthogonal to the first and second directions. A second heat conduction member is also within the interior region. The heater is between the second heat conduction member and the region of the outer surface of the belt in the third direction. The second heat conduction member has a recess facing towards the heater in the third direction and extending in the second direction.

Figure 1:
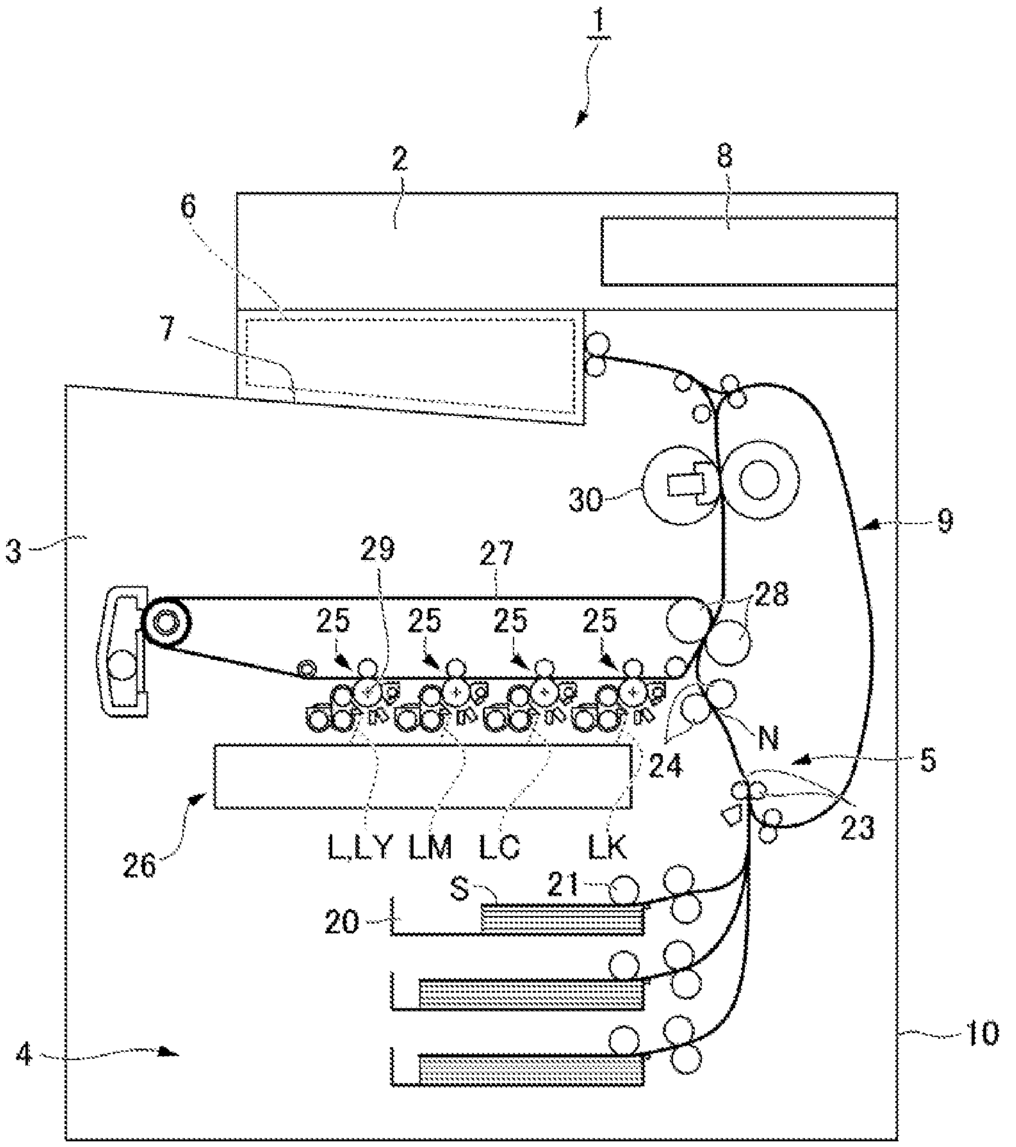
FIG. 1 is a schematic configuration diagram of an image forming apparatus of an embodiment.

FIG. 1 depicts a schematic configuration of an image forming apparatus 1 according to an embodiment. The image forming apparatus 1 performs a process for forming an image on a sheet S. The image forming apparatus 1 includes a housing 10, a scanner unit 2, an image forming unit 3, a sheet supply unit 4, a conveyance unit 5, a discharge tray 7, a reversing unit 9, a control panel 8, and a controller 6.

The housing 10 forms the outer shape of the image forming apparatus 1.

The scanner unit 2 reads image information from an object (e.g., a document) to be copied as regions of brightness and darkness of reflected light or the like and generates an image signal accordingly. The scanner unit 2 outputs the generated image signal to the image forming unit 3.

The image forming unit 3 forms an image with a recording material, such as toner, based on the image signal received from the scanner unit 2 or, alternatively, an image signal received from the outside from an external device or the like. The image that is output by the image forming unit 3 is referred to as a toner image in this context. The image forming unit 3 subsequently transfers the toner image onto the surface of a sheet S. The image forming unit 3 then heats and presses the toner image to fix the toner image to the sheet S. The image forming unit 3 thus forms an image on the sheet S. This may be referred to as a printing process or operation in some instances.

The sheet supply unit 4 supplies sheets S one by one to the conveyance unit 5 in accordance with the timing at which the image forming unit 3 forms the toner image for transfer to the sheet. The sheet supply unit 4 includes a sheet storage unit 20 and a pickup roller 21. The sheet storage unit 20 stores sheets S of a particular size and type. The pickup roller 21 takes out the sheets S one by one from the sheet storage unit 20. The pickup roller 21 supplies the sheet S to the conveyance unit 5.

The conveyance unit 5 conveys the sheets S supplied from the sheet supply unit 4 to the image forming unit 3. The conveyance unit 5 comprises conveyance rollers 23 and registration rollers 24. A conveyance roller 23 (or a pair or more of conveyance rollers 23) conveys a sheet S from the pickup roller 21 to the registration rollers 24. The conveyance roller 23 makes the front end of the sheet S in the conveyance direction to abut against the nip N of the registration rollers 24. The registration rollers 24 serve to adjust the position of the front end of the sheet S along the conveyance direction by bending or holding the sheet S at the nip N. The registration rollers 24 then convey the sheet S to match the timing at which the image forming unit 3 is to transfer the toner image onto the sheet S.

The image forming unit 3 includes a plurality of image forming units 25. The image forming unit 3 also includes a laser scanning unit 26, an intermediate transfer belt 27, a transfer unit 28, and a fixing device 30. Each image forming unit 25 includes a photosensitive drum 29. Each image forming unit 25 forms a toner image on its respective photosensitive drum 29 in accordance with an image signal from the scanner unit 2 or the outside. The plurality of image forming units 25 form toner images different respective colors, for example, one image forming unit 25 forms a toner image with a yellow toner, another image forming unit 25 forms a toner image with a magenta, toner, and so forth for cyan toner, and a black toner.

An electrostatic charger, a developing device, and the like are disposed around each photosensitive drum 29. The electrostatic charger electrostatically charges the surface of the photosensitive drum 29. The developing device contains a developer containing one of the yellow, magenta, cyan, and black toners. The developing device develops an electrostatic latent image that is formed on the photosensitive drum 29 by selective exposure (according to the image signal). A toner image of toner of each respective color is formed on a photosensitive drum 29 of the respective image forming units 25.

The laser scanning unit 26 scans the electrostatically charged photosensitive drum 29 with laser light L to selectively expose the photosensitive drums 29 to generate the electrostatic latent images. The laser scanning unit 26 exposes the photosensitive drums 29 of the image forming units 25 of each toner color with a respective laser beam LY, LM, LC, LK for each. The laser scanning unit 26 thus forms an electrostatic latent image on the photosensitive drums 29.

The toner image on the surface of the photosensitive drum 29 is transferred to the intermediate transfer belt 27, this may be referred to as a primary transfer. The transfer unit 28 then transfers the toner image from the intermediate transfer belt 27 onto the surface of the sheet S at the secondary transfer position. The fixing device 30 heats and presses the toner image transferred onto the sheet S to fix the toner image onto the sheet S.

The reversing unit 9 can reverse the sheet S so an image can be formed on the back surface of the sheet S. The reversing unit 9 returns a sheet S already once discharged from the fixing device 30 back to registration rollers 24 using a switchback or the like. That is, the reversing unit 9 conveys a reversed sheet S back toward the registration rollers 24 by alternative path rather than via the fixing device 30 and the transfer unit 28. A sheet S on which an image has been formed can be discharged to the discharge tray 7.

The control panel 8 is a part of a user input unit through which an operator inputs information for operating the image forming apparatus 1. The control panel 8 in this example includes a touch panel and various hard keys or buttons.

The controller 6 controls each unit of the image forming apparatus 1.

Figure 2:
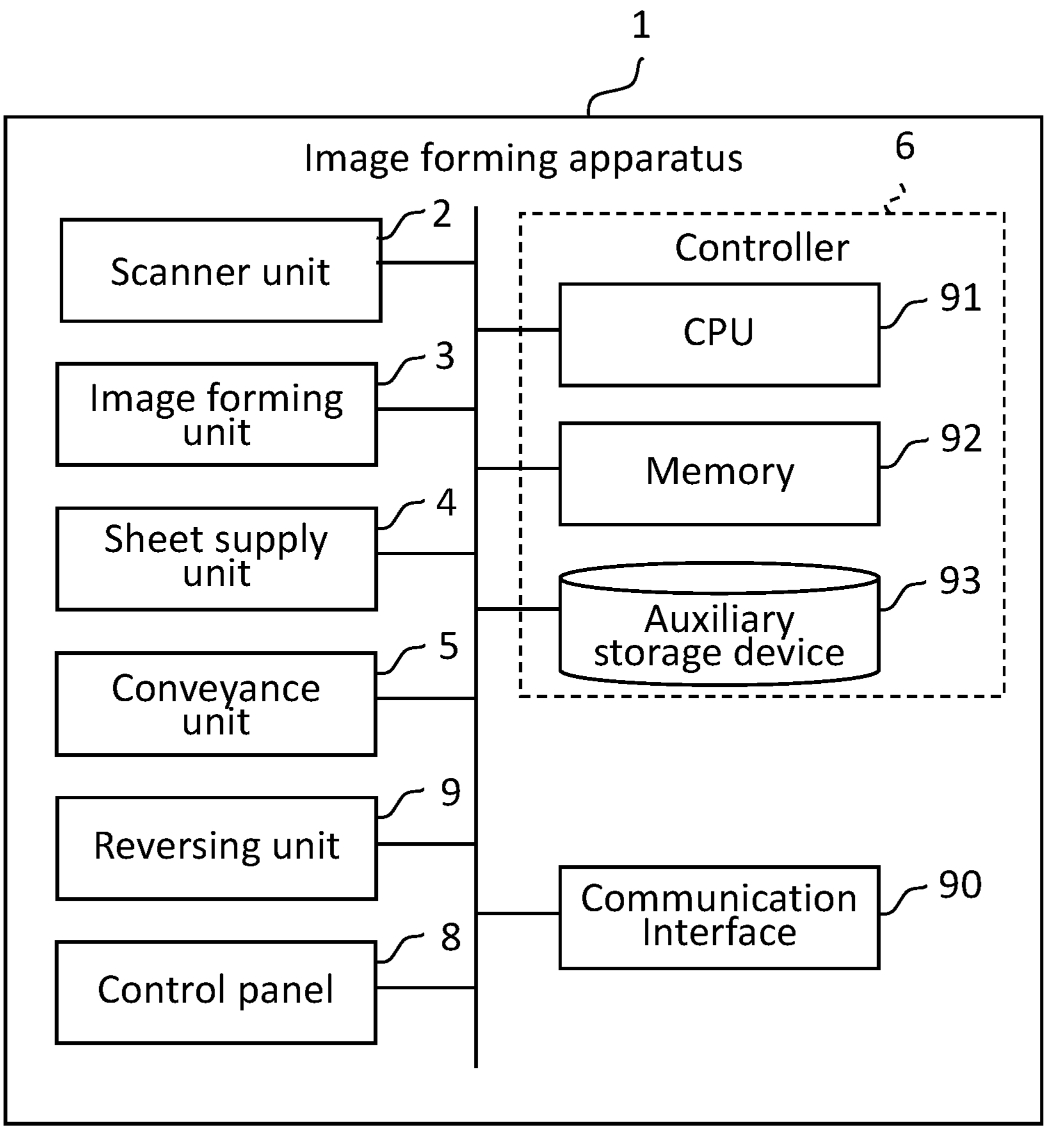
FIG. 2 is a hardware configuration diagram of an image forming apparatus according to an embodiment.

FIG. 2 is a hardware configuration diagram of the image forming apparatus 1. The image forming apparatus 1 includes a CPU (Central Processing Unit) 91, a memory 92, an auxiliary storage device 93, and the like. The CPU 91 executes a software program or the like. The image forming apparatus 1 includes a scanner unit 2, an image forming unit 3, a sheet supply unit 4, a conveyance unit 5, a reversing unit 9, a control panel 8, and a communication interface 90. Various functions of these various units and/or components can be realized by the CPU 91 executing a program.

In particular, CPU 91 performs various functions of the controller 6 by executing programs stored in the memory 92 and/or the auxiliary storage device 93. The controller 6 controls overall operations of the individual units and/or components of the image forming apparatus 1.

The auxiliary storage device 93 comprises a magnetic hard disk device (HDD) or a semiconductor storage device (SSD). The auxiliary storage device 93 stores information, data, and programs.

The communication interface 90 includes an interface for connecting the image forming apparatus 1 to an external apparatus. The communication interface 90 communicates with an external apparatus via a communication connection, network, or the like.

Figure 3:
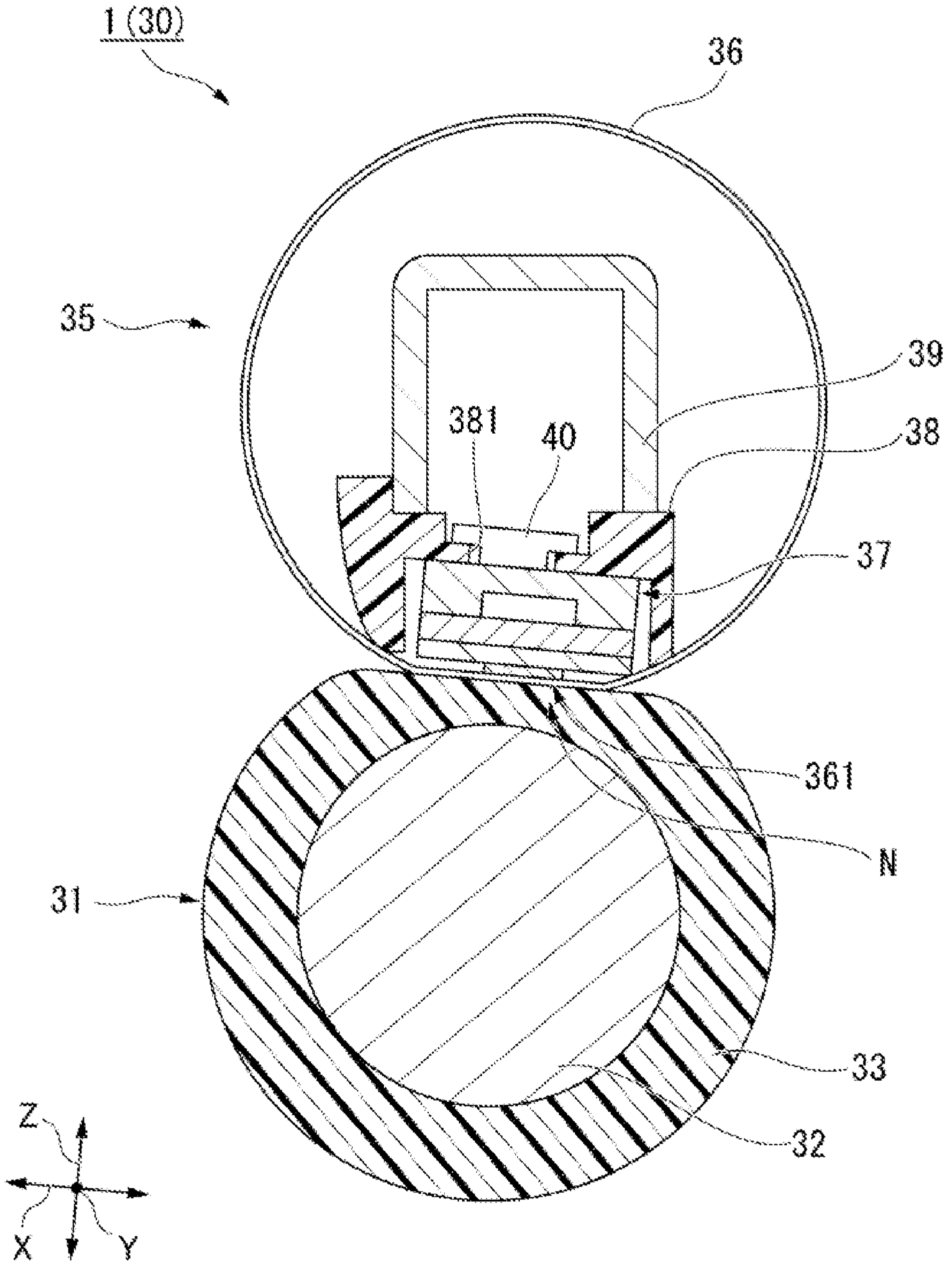
FIG. 3 is a cross-sectional view of a fixing device in an image forming apparatus of an embodiment.

As shown in FIG. 3, the fixing device 30 includes a pressure roller 31 and a fixing belt unit 35 (sometimes referred to as a fixing drum).

The pressure roller 31 forms a nip N with the fixing belt unit 35. The pressure roller 31 applies pressure to the toner image on the sheet S that has entered the nip N. The pressure roller 31 rotates and conveys the sheet S through the nip N. The pressure roller 31 includes a core metal 32, an elastic layer 33, and a release layer.

The core 32 is formed in a cylindrical rod shape from a metal material such as stainless steel. Both end parts of the core metal 32 in the axial direction are rotatably supported. The core 32 is rotationally driven by a motor. The core metal 32 abuts on a cam member. The cam member rotates to move the core metal 32 toward and away from the fixing belt unit 35.

The elastic layer 33 is formed of an elastic material such as silicone rubber. The elastic layer 33 is formed on the outer peripheral surface of the core metal 32. The release layer is formed of a resin material such as PFA (e.g., tetrafluoroethylene/perfluoroalkyl vinyl ether copolymer). The release layer is formed on the outer peripheral surface of the elastic layer 33. The hardness of the outer peripheral surface of the pressure roller 31 is preferably 40 degrees to 70 degrees under a load of 9.8 N (newtons) as measured by an ASKER-C hardness meter. This ensures the areas of the nip N and the durability of the pressure roller 31.

The pressure roller 31 can approach and separate from the fixing belt unit 35 by rotation of the cam member. When the pressure roller 31 is brought close to the fixing belt unit 35 and pressed by a pressure spring against the fixing belt unit 35, the nip N is formed. On the other hand, when a jam of a sheet S occurs in the fixing device 30, the sheet S can be removed by separating the pressure roller 31 from the fixing belt unit 35. When the cylindrical body 36 stops rotating for a prolonged time, such as during a device sleep state or the like, the pressure roller 31 can be separated from the fixing belt unit 35, thereby preventing plastic deformation of the cylindrical body 36.

The pressure roller 31 is rotated by a motor. When the pressure roller 31 rotates while the nip N is formed, the cylindrical body 36 of the fixing belt unit 35 is driven to rotate. The pressure roller 31 conveys the sheet S in the conveyance direction X by rotating while the sheet S is in the nip N.

The fixing belt unit 35 heats the toner image on the sheet S that has entered the nip N. The fixing belt unit 35 includes a cylindrical body 36, a heater unit 37, a support member 38, a stay 39, and a temperature sensitive element 40.

Figure 4:
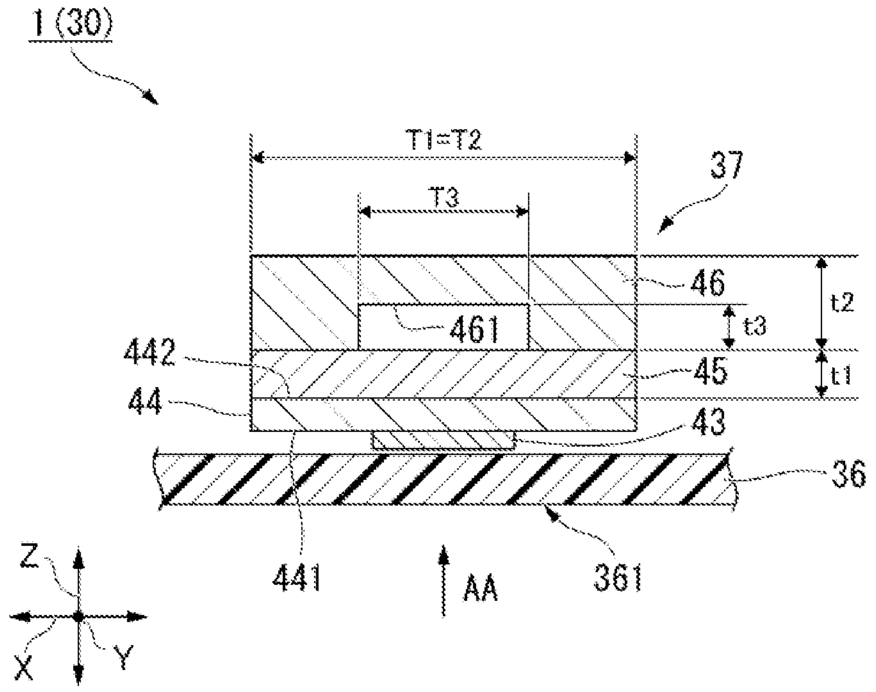
FIG. 4 is an enlarged view of a portion of a fixing device.
Figure 5:
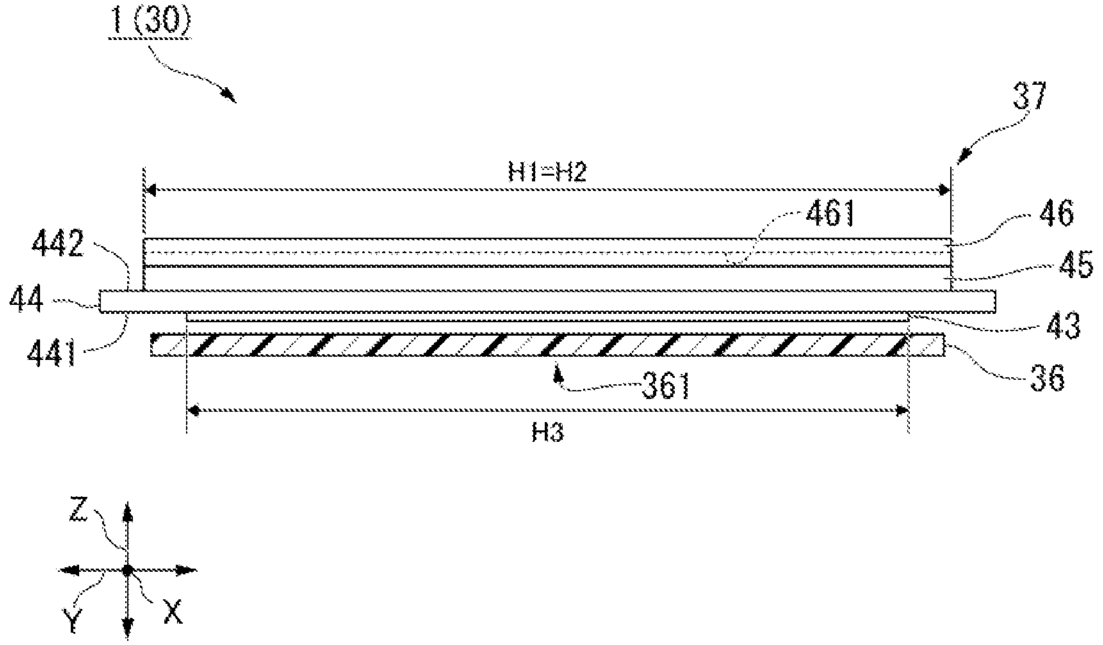
FIG. 5 is a view of a fixing device in the direction of arrow AA depicted in FIG. 4.

The cylindrical body 36 is a cylindrical shaped a film material or the like. The cylindrical body 36 includes a base layer, an elastic layer, and a release layer in this order from its inner circumferential side. The base layer is formed from a material such as nickel (Ni). The elastic layer is laminated on the outer peripheral surface of the base layer. The elastic layer is formed of an elastic material such as silicone rubber. The release layer is laminated on the outer peripheral surface of the elastic layer. The release layer is formed of a material such as PFA resin. As shown in FIGS. 4 and 5, the heater unit 37 includes a heater 43, a substrate 44, a first heat conduction member 45, and a second heat conduction member 46.

The heater 43 is formed in a flat plate shape of a silver-palladium alloy or the like. The heater 43 is disposed inside the region surrounded by the cylindrical body 36. The heater 43 has a length (long dimension) paralleling the axial direction Y of the cylindrical body 36. In this context, the axial direction Y is a direction orthogonal to the conveyance direction X for the sheet S through the nip N. Wiring is connected to the heater 43. When the heater 43 is energized through the electric power supplied via the wiring, the heater 43 generates heat. The heater 43 faces, in the circumferential direction, a heated region 361 that is a part of the cylindrical body 36. The heater 43 operates to heat the heated region 361. In this context, the direction in which the heated region 361 and the heater 43 face each other is referred to as a first direction Z. The first direction Z is also a thickness direction of the heater 43. The conveyance direction X and the axial direction Y are directions orthogonal to the first direction Z.

The substrate 44 is formed of a metal material such as stainless steel or a ceramic material such as aluminum nitride. The substrate 44 has a generally rectangular plate shape. The substrate 44 is inside the region surrounded by the cylindrical body 36. The substrate 44 has a length (long dimension) in the axial direction Y. The substrate 44 is on the opposite side of the heater 43 from the heated region 361. The heater 43 and the wiring are on a first surface 441 of the substrate 44. The heater 43 is fixed to the center (along the conveyance direction X) of the first surface 441.

The first heat conduction member 45 is formed of graphite or the like. The first heat conduction member 45 is a flat plate shape with a thickness direction in the first direction Z. In this example, the first heat conduction member 45 has anisotropic thermal conductivity. The first heat conduction member 45 is located on the opposite side of the substrate 44 from the heated region 361 with respect to the heater 43. The first heat conduction member 45 is fixed to a second surface 442 of the substrate 44. The second surface 442 is on an opposite side of the substrate from the first surface 441. In the first heat conduction member 45, the thermal conductivity in the conveyance direction X and the thermal conductivity in the axial direction Y are both larger than the thermal conductivity in the first direction Z. The thickness of the first heat conduction member 45 is in a range of 10 μm to 1000 μm or so. In this context, the thickness dimension is a distance along the first direction Z. The thermal conductivity of the first heat conduction member 45 in the first direction Z is in a range of 1 W/(m×K) to 20 W/(m×K) or so. The thermal conductivities of the first heat conduction member 45 in the conveyance direction X and the axial direction Y are both in a range of 300 W/(m×K) to 2000 W/(m×K) or so. The thermal conductivities in the respective conveyance direction X and the axial direction Y may be equal to one another or different.

The second heat conduction member 46 is made of copper, stainless steel, or the like, and is formed in a flat plate shape whose thickness direction is the first direction Z. In the second heat conduction member 46, the thermal conductivity is substantially constant regardless of the direction. As shown in FIG. 4, a thickness t1 of the second heat conduction member 46 is greater than a thickness t2 of the first heat conduction member 45. A length T1 of the first heat conduction member 45 in the conveyance direction X and a length T2 of the second heat conduction member 46 in the conveyance direction X are equal to each other in this example. Along the conveyance direction X, the center of the first heat conduction member 45 and the center of the second heat conduction member 46 coincide with each other. The second heat conduction member 46 is arranged facing the heater 43 (or the substrate 44 on which heater 43 is mounted) with the first heat conduction member 45 in between.

As shown in FIG. 5, a length H1 in the axial direction Y of the first heat conduction member 45 and a length H2 of the second heat conduction member 46 in the axial direction Y are equal to each other. The length H1 of the first heat conduction member is however longer than a length H3 of the heater 43 in the axial direction Y.

As shown in FIGS. 4 and 5, the second heat conduction member 46 has a recess 461 in the surface facing the first heat conduction member 45. As shown in FIG. 4, the recess 461 is formed so as to include the position range along the conveyance direction X in which the heater 43 is disposed.

As shown in FIG. 5, the recess 461 is formed so as to include the position range in which the heater 43 is disposed in the axial direction Y. The recess 461 preferably penetrates the second heat conduction member 46 along the axial direction Y. A depth t3 of the recess 461 is 0.1 mm to 1.0 mm or so. A width T3 of the recess 461 is 1 mm to 10 mm or so. The recess 461 does not contact the first heat conduction member 45. On the other hand, both edges of the second heat conduction member 46 across the recess 461 in the conveyance direction X are in contact with the first heat conduction member 45. The first heat conduction member 45 and the second heat conduction member 46 are both disposed inside region surrounded by the cylindrical body 36. In the heater unit 37, the heater 43, the substrate 44, the first heat conduction member 45, and the second heat conduction member 46 are arranged in this order from the heated region 361 side.

The support member 38 is formed of a resin material such as a liquid crystal polymer. As shown in FIG. 3, the support member 38 is disposed so as to cover the side of the heater unit 37 opposite to the heated region 361 and both sides in the conveyance direction X. The support member 38 supports the heater unit 37. The support member 38 also functions to support the inner peripheral surface of the cylindrical body 36 at both end parts (in the conveyance direction X) of the heater unit 37.

The stay 39 is formed of a steel plate material or the like. A cross section of the stay 39 perpendicular to the axial direction Y is U-shaped. The stay 39 is attached to the support member 38 on the side opposite to the heated region 361 so that the opening of the U shape is closed by the support member 38. The stay 39 has a length (long dimension) in the axial direction Y. Both end portions of the stay 39 in the axial direction Y can be fixed to the housing 10 of the image forming apparatus 1. Thus, the fixing belt unit 35 is supported by the image forming apparatus 1. The stay 39 improves (increases) the rigidity of the fixing belt unit 35. Flanges that restrict movement of the cylindrical body 36 in the axial direction Y can be attached near the end of the stay 39 in the axial direction Y.

The temperature sensitive element 40 is disposed on an outer surface of the heater unit 37 opposite to the heated region 361. The temperature sensitive element 40, or a portion thereof, can be disposed inside a hole 38*a* that penetrates the support member 38 in the first direction Z.

When printing is started in the image forming apparatus 1, the heater 43 raises the temperature of the cylindrical body 36 to a fixing temperature. When the heater 43 generates heat starting from a normal resting temperature or the like, the temperature distribution in the heater 43 will tend to be highest at its center along the conveyance direction X. The temperature of the heater 43 generally decreases as the distance from the center of the heater 43 increases. Thus, the temperature distribution of the heater 43 has a peak-like shape having a peak temperature near the center position. The recess 461 of the second heat conduction member 46 is formed so as to be above the center position of the heater 43, which corresponds the peak temperature position.

As described above, according to the image forming apparatus 1, the heated region 361 of the cylindrical body 36 can be heated by the heater 43. In the first heat conduction member 45, the thermal conductivity in the conveyance direction X and the axial direction Y orthogonal to the first direction Z is greater than the thermal conductivity in the first direction Z. The heat generated by the heater 43 is transferred more in the conveyance direction X and the axial direction Y than in the first direction Z. Furthermore, the second heat conduction member 46 has the recess 461. Since the recess 461 is not in contact with the first heat conduction member 45, most of the heat generated by the heater 43 will be transmitted to the cylindrical body 36 without being transmitted to the second heat conduction member 46. Thus, the cylindrical body 36 can be more efficiently heated, and the time until printing is started can be shortened. That is, the time required for the image forming apparatus 1 to return from a sleep, idle, or off state can be kept or made shorter.

The thickness t2 of the second heat conduction member 46 can be thicker than the thickness t1 of the first heat conduction member 45. For example, a first heat conduction member 45 formed of graphite can be more reliably reinforced by a second heat conduction member 46 formed of stainless steel. The recess 461 is formed so as to include the position range in which the heater 43 is disposed in the axial direction Y. Heat generated by the heater 43 is transmitted to the cylindrical body 36 without being transmitted to the second heat conduction member 46 in the axial direction Y. Since the cylindrical body 36 is heated more efficiently, the time until the start of printing can be further shortened.

The recess 461 extends along the second heat conduction member 46 in the axial direction Y. Heat generated by the heater 43 is thus primarily transferred to the cylindrical body 36 without being transferred to the second heat conduction member 46 due to the presence of the recess 461 at any position in the axial direction Y matching the heater 43. Since the cylindrical body 36 is heated more efficiently, the time until the start of printing can be further shortened.

Figure 6:
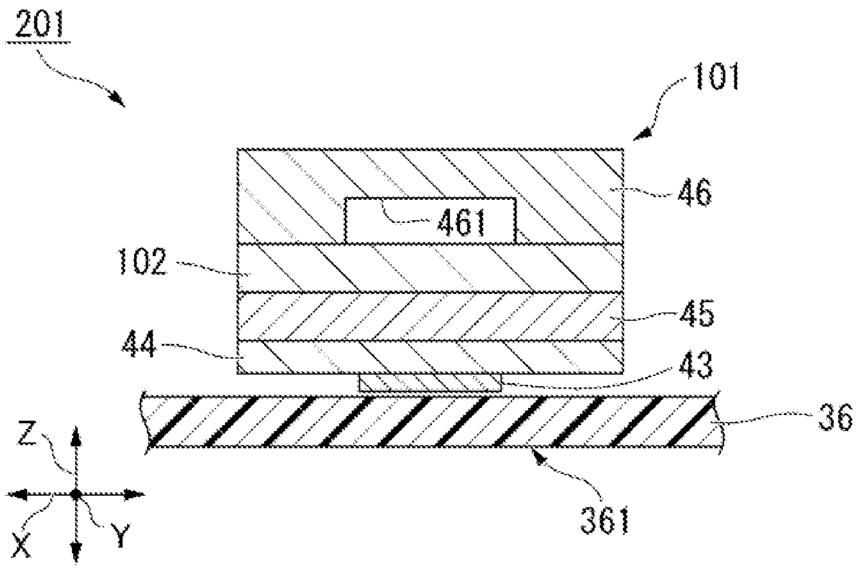
FIG. 6 is a cross-sectional view of a heater unit in an image forming apparatus according to a first modification.

The configuration of the image forming apparatus 1 can be variously modified as described below. An image forming apparatus 201 according to a first modification illustrated in FIG. 6 includes a heater unit 101. The heater unit 101 includes a third heat conduction member 102. The third heat conduction member 102 is located between the first heat conduction member 45 and the second heat conduction member 46. The third heat conduction member 102 is made of copper, stainless steel, or the like, and is formed in a flat plate shape in which the first direction Z is the thickness direction.

It is preferable that no recess is formed in the third heat conduction member 102. The length in the axial direction Y of the third heat conduction member 103 is equal to the length H1 of the first heat conduction members 45 and the length H2 of the second heat conduction members 46. The thickness of the third heat conduction member 102 is 50 μm to 100 μm or so. The third heat conduction member 102 is preferably has a thickness less than the thickness t2 of the second heat conduction member 46. The image forming apparatus 201 according to the first modification includes the third heat conduction member 102. For example, when the heater 43 is pressed by the pressure roller 31 via the cylindrical body 36, deformation of the heater 43, the substrate 44, the first heat conduction member 45, and the second heat conduction member 46 can be more reliably avoided.

Figure 7:
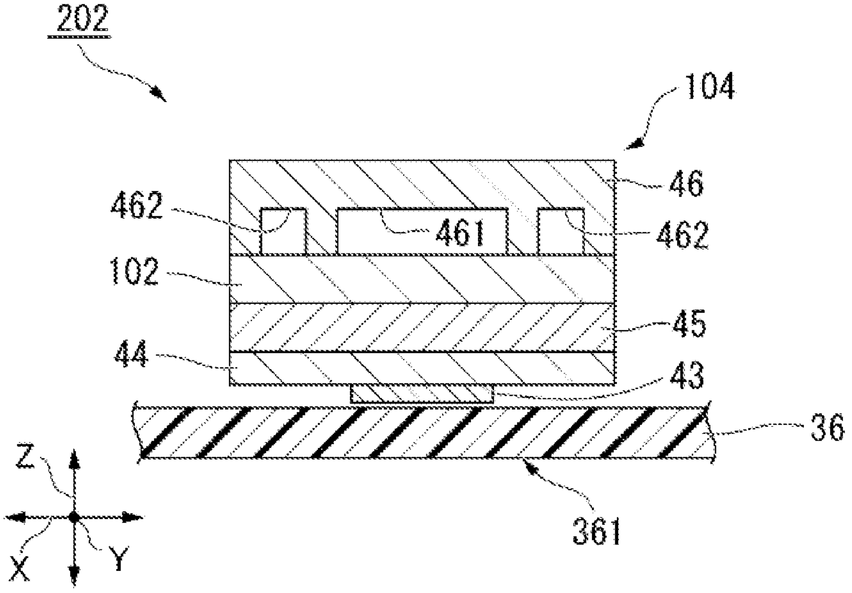
FIG. 7 is a cross-sectional view of a heater unit in an image forming apparatus according to a second modification.

An image forming apparatus 202 according to a second modification illustrated in FIG. 7 includes a heater unit 104. The heater 104 may include a second recess 462 provided in the second heat conduction member 46. In the image forming apparatus 202, the second heat conduction member 46 includes a pair of second recesses 462. The pair of second recesses 462 are on either side of the recess 461 in the conveyance direction X. The number of second recesses 462 formed in the second heat conduction member 46 is not particularly limited.

The range between a first end in the conveyance direction X to a second end opposite to the first end for all of the recesses together (recess 461 and the second recesses 462) covers the position range in which the heater 43 is disposed. When the image forming apparatus 202 is utilized, the same effects as those of the image forming apparatus 1 can be obtained. Furthermore, the second heat conduction member 46 can be supported at a position between the recess 461 and a second recess 462.

Figure 8:
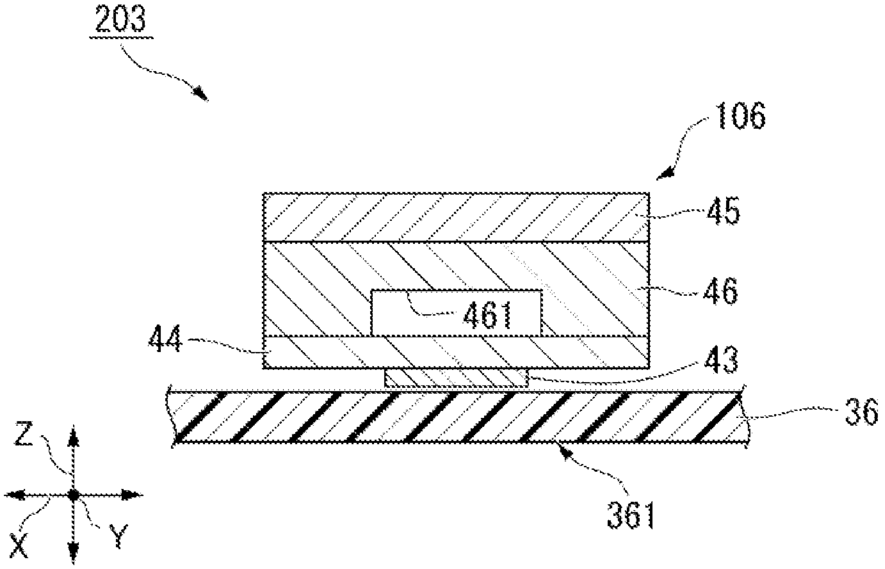
FIG. 8 is a cross-sectional view of a heater unit in an image forming apparatus according to a third modification.

An image forming apparatus 203 according to a third modification illustrated in FIG. 8 includes a heater unit 106. In the heater unit 106, the first heat conduction member 45 and the second heat conduction member 46 of the heater unit 37 may be switched with each other in positions in the first direction Z. Specifically, in the heater unit 106, the heater 43, the substrate 44, the second heat conduction member 46, and the first heat conduction member 45 are disposed in this order from the heated region 361 side.

The recess 461 of the second heat conduction member 46 is still located on a surface of the second heat conduction member 46 facing the substrate 44 and the heater 43, but the first heat conduction member 45 is now on an opposite side. The image forming apparatus 203 can also achieve the similar effects as those of the image forming apparatus 1.

Figure 9:
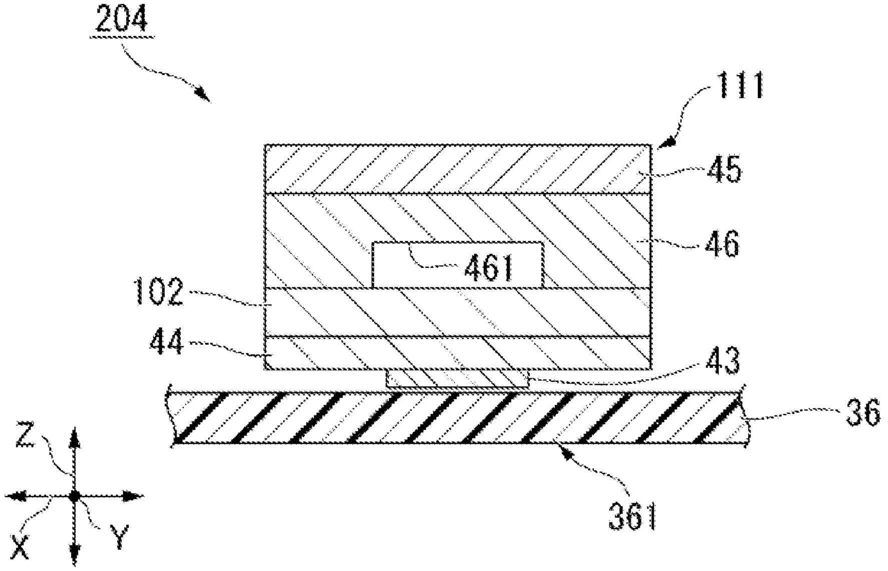
FIG. 9 is a cross-sectional view of a heater unit in an image forming apparatus according to a fourth modification.

An image forming apparatus 204 according to a fourth modification illustrated in FIG. 9 includes a heater unit 111. The heater unit 111 may include a third heat conduction member 102 disposed between the substrate 44 and the second heat conduction member 46 of the heater unit 106 of the third modification. The image forming apparatus 204 includes the third heat conduction member 102. Therefore, for example, when the heater 43 is pressed by the pressure roller 31 via the cylindrical body 36, it is possible to more reliably avoid deformation of the heater 43, the substrate 44, the second heat conduction member 46, and the first heat conduction member 45.

In other examples, any one of the described the heater unit 37, 101, 104, 106, or 111 need not include the substrate 44. In still other examples, the thickness t2 of the second heat conduction member 46 may be less than or equal to the thickness t1 of the first heat conduction member 45. In other examples, the recess 461 need not be formed so as to include the entire position range in which the heater 43 is disposed along the axial direction Y. For example, the recess 461 may be formed so as to include only a part of the position range in which the heater 43 is disposed. Likewise, the recess 461 may be formed only in some part of the second heat conduction member 46 along the axial direction Y rather than the entire length in axial direction Y of the second heat conduction member 46.

In some examples, the first heat conduction member 45 and the second heat conduction member 46 may not be flat plates whose thickness direction coincides with the first direction Z. For example, the first heat conduction member 45 and/or the second heat conduction member 46 may be formed in a rectangular parallelepiped shape.

According to at least one of the embodiments described above, by having the recess 461 formed in the second heat conduction member 46, it is possible to shorten the time until the start of printing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
- an image forming unit configured to form a toner image on a sheet; and
- a fixing device configured to heat the toner image on the sheet and including:
  - a cylindrical belt having an outer surface configured to contact the sheet,
  - a heater on an inner surface side of the cylindrical belt and having a width in a first direction and a length in a second direction, the heater being positioned to heat a region of the outer surface,
  - a first heat conduction member, the heater being between the first heat conduction member and the region of the outer surface in a third direction orthogonal to the first and second directions, and
  - a second heat conduction member, the heater being between the second heat conduction member and the region of the outer surface in the third direction, wherein
- the second heat conduction member has a first recess facing towards the heater in the third direction and extending in the second direction, and
- the second heat conduction member has a second recess spaced from the first recess in the first direction, wherein
- a length of the first heat conduction member in the second direction is equal to a length of the second heat conduction member in the second direction.

2. The image forming apparatus according to claim 1, wherein the first heat conduction member has an anisotropic thermal conductivity.

3. The image forming apparatus according to claim 2, wherein the thermal conductivity of the first heat conduction member in the first or second direction is greater than the thermal conductivity of the first heat conduction member in the third direction.

4. The image forming apparatus according to claim 1, wherein the width of the heater in the first direction is less than or equal to a width of the first recess in the first direction.

5. The image forming apparatus according to claim 1, wherein the first heat conduction member is between the heater and the second heat conduction member in the third direction.

6. The image forming apparatus according to claim 1, wherein the second heat conduction member is between the heater and the first heat conduction member in the third direction.

7. The image forming apparatus according to claim 1, further comprising:
- a substrate on which the heater is disposed, the heater being between the region of the outer surface and the substrate in the third direction.

8. The image forming apparatus according to claim 1, further comprising:
- a third heat conduction member between the heater and the first heat conduction member in the third direction.

9. The image forming apparatus according to claim 8, wherein a maximum thickness of the third heat conduction member in the third direction is less than or equal to a maximum thickness of the first heat conduction member.

10. The image forming apparatus according to claim 1, wherein
- the first heat conduction member comprises graphite, and the second heat conduction member comprises a metal.

11. The image forming apparatus according to claim 1, wherein the first recess in the second heat conduction member overlaps the heater when viewed from the third direction.

12. The image forming apparatus according to claim 1, wherein
- the first recess overlaps the heater when viewed from the third direction, and
- the second recess does not overlap the heater when viewed from the third direction.

13. An image forming apparatus, comprising:
- an image forming unit configured to form a toner image on a sheet; and
- a fixing device configured to heat the toner image on the sheet and including:
  - a cylindrical belt having an outer surface configured to contact the sheet,
  - a heater on an inner surface side of the cylindrical belt and having a width in a first direction and a length in a second direction, the heater being positioned to heat a region of the outer surface,
  - a first heat conduction member, the heater being between the first heat conduction member and the region of the outer surface in a third direction orthogonal to the first and second directions, and
  - a second heat conduction member, the heater being between the second heat conduction member and the region of the outer surface in the third direction, wherein
- the second heat conduction member has a recess facing towards the heater in the third direction and extending in the second direction,
- the first heat conduction member comprises graphite, and the second heat conduction member comprises a metal.

14. A fixing device for fixing toner to a sheet, the fixing device comprising:
- a cylindrical belt having an outer surface configured to contact a sheet;
- a heater on an inner surface side of the cylindrical belt and having a width in a first direction and a length in a second direction, the heater being positioned to heat a region of the outer surface;
- a first heat conduction member, the heater being between the first heat conduction member and the region of the outer surface in a third direction orthogonal to the first and second directions; and
- a second heat conduction member, the heater being between the second heat conduction member and the region of the outer surface in the third direction, wherein the second heat conduction member has a first recess facing towards the heater in the third direction and extending in the second direction, the second heat conduction member has a second recess spaced from the first recess in the first direction, the first recess in the second heat conduction member overlaps the heater when viewed from the third direction, the second recess in the second heat conduction member does not overlap the heater when viewed from the third direction, the first heat conduction member comprises graphite, and the second heat conduction member comprises a metal.

15. The fixing device according to claim 14, wherein the thermal conductivity of the first heat conduction member in the first or second direction is greater than the thermal conductivity of the first heat conduction member in the third direction.

16. The fixing device according to claim 14, wherein the first heat conduction member is between the heater and the second heat conduction member in the third direction.

17. The fixing device according to claim 14, wherein the thermal conductivity of the first heat conduction member in the first or second direction is greater than the thermal conductivity of the first heat conduction member in the third direction.

18. The fixing device according to claim 14, wherein the first recess in the second heat conduction member overlaps the heater when viewed from the third direction.

19. The fixing device according to claim 14, further comprising:

a third heat conduction member between the heater and the first heat conduction member in the third direction, wherein a maximum thickness of the third heat conduction member in the third direction is less than or equal to a maximum thickness of the first heat conduction member.

20. An image forming apparatus, comprising:

an image forming unit configured to form a toner image on a sheet; and the fixing device according to claim 14.

* * * * *